United States Patent
Kraus et al.

(10) Patent No.: US 7,398,481 B2
(45) Date of Patent: Jul. 8, 2008

(54) VIRTUAL ENVIRONMENT CAPTURE

(75) Inventors: Matthew Kraus, Orlando, FL (US);
Benito Graniela, Orlando, FL (US);
Mary Pigora, Orlando, FL (US)

(73) Assignee: Science Applications International Corporation (SAIC), San Diego, CA (US)

( * ) Notice: Subject to any disclaimer, the term of this patent is extended or adjusted under 35 U.S.C. 154(b) by 802 days.

(21) Appl. No.: 10/441,121

(22) Filed: May 20, 2003

(65) Prior Publication Data

US 2004/0109012 A1 Jun. 10, 2004

Related U.S. Application Data

(60) Provisional application No. 60/432,009, filed on Dec. 10, 2002.

(51) Int. Cl.
*G06F 3/048* (2006.01)
*G06T 15/00* (2006.01)

(52) U.S. Cl. .................................. 715/848; 345/419

(58) Field of Classification Search ................ 715/757, 715/766, 848–852; 345/419, 58, 632, 633
See application file for complete search history.

(56) References Cited

U.S. PATENT DOCUMENTS

| 6,590,640 | B1 * | 7/2003 | Aiken et al. | 356/3.01 |
| 7,139,685 | B2 * | 11/2006 | Bascle et al. | 703/1 |
| 2003/0001835 | A1 * | 1/2003 | Dimsdale et al. | 345/419 |
| 2003/0137506 | A1 * | 7/2003 | Efran et al. | 345/419 |

FOREIGN PATENT DOCUMENTS

| WO | WO 00/60853 | | 10/2000 |
| WO | WO 00/60869 | A1 | 10/2000 |
| WO | WO 00/60870 | A1 | 10/2000 |

OTHER PUBLICATIONS

Surman et al., "An autonomous mobile robot with a 3D laser range finder for 3D exploration and digitization of indoor environments," recieved Jan. 8, 2003, available online Dec. 2, 2003, Science Direct, vol. 45, Issues 3-4, pp. 181-198.*
Jill Ashby et al., "Correlating Large Area Visual and SAF Databases: Challenges and Solutions", 7th CGF Conference Proceedings, 1998.
Jon Watkins et al., "Design of Terrain Reasoning Database for CCTT", pp. 62-68, 1994.
Benito Graniela et al., "Virtual Environment Capture System", Jul. 2002.
Mary Ann Pigora et al., "Urban Human Simulation Environments in CTDB", In Proceedings of the Spring 2001 Simulation Interoperability Workshop, IEEE, 2001.
Mary Ann Pigora et al., "A System For The Rapid Capture of Virtual Environments", Interservice/Industry Training, Simulation and Education Conference, Nov. 2002.

* cited by examiner

*Primary Examiner*—Ba Huynh
*Assistant Examiner*—Shashi K Becker
(74) *Attorney, Agent, or Firm*—Banner & Witcoff, Ltd.

(57) ABSTRACT

A system and method for capturing and modeling an environment is described. A user may direct a rangefinder within an environment to capture data points and correlate the data points with predefined objects. One may also capture images of the environment to be used in the modeling environment. Using the present system, one may easily and quickly capture an environment using relatively few data points.

16 Claims, 16 Drawing Sheets

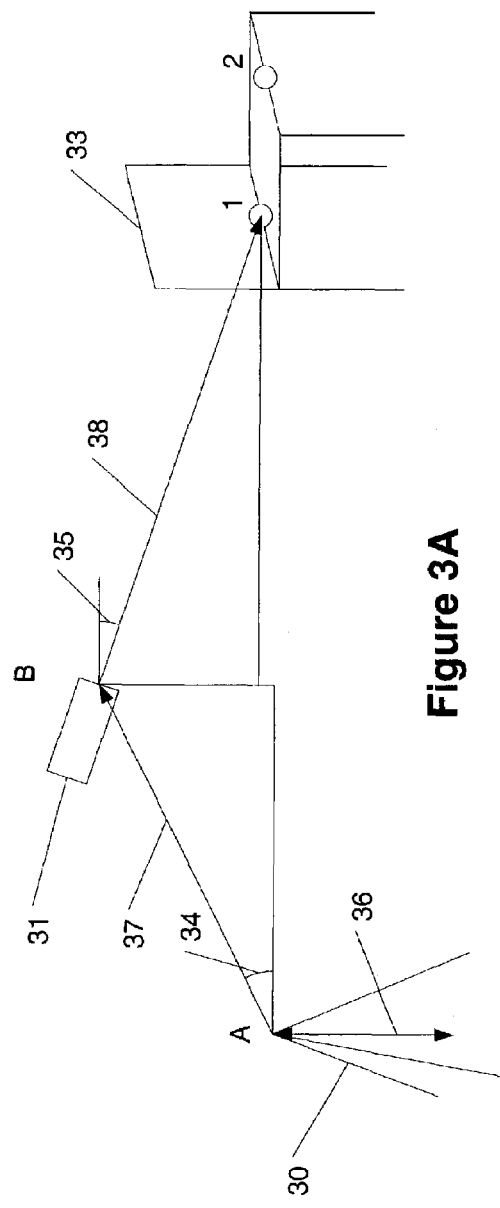
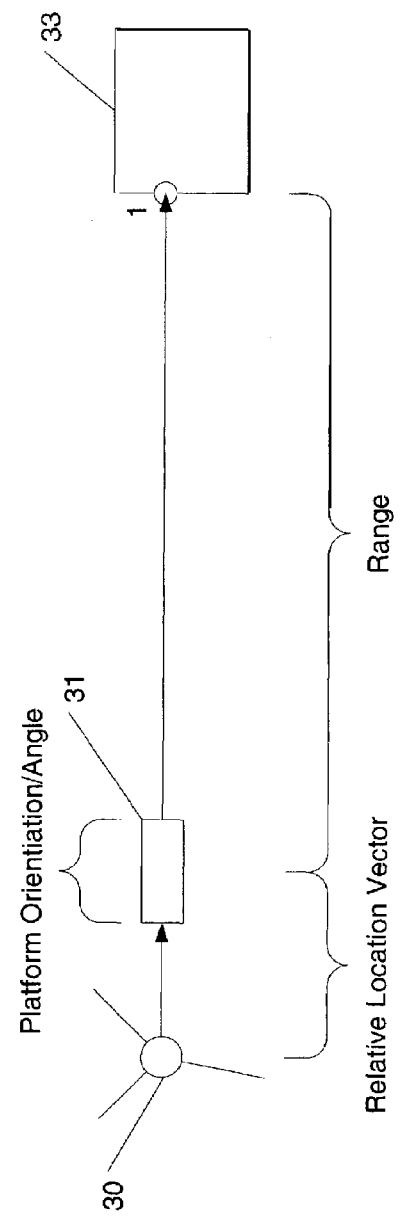
Figure 3A
Figure 3B

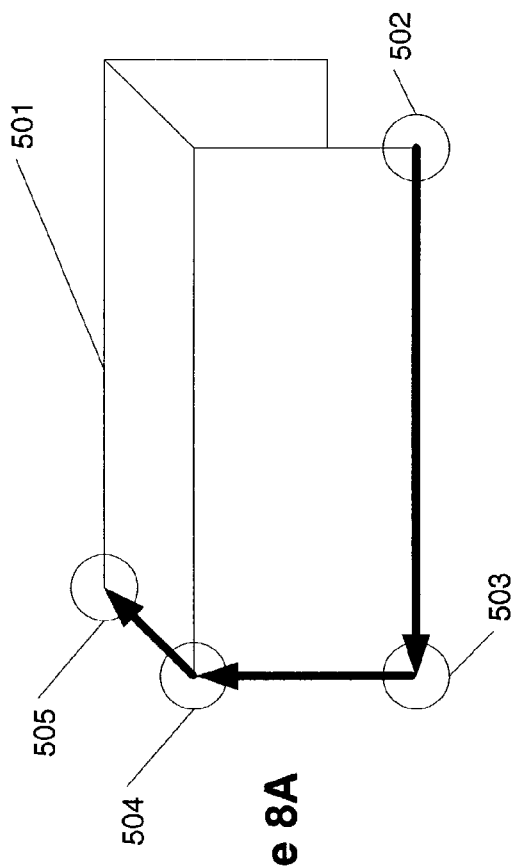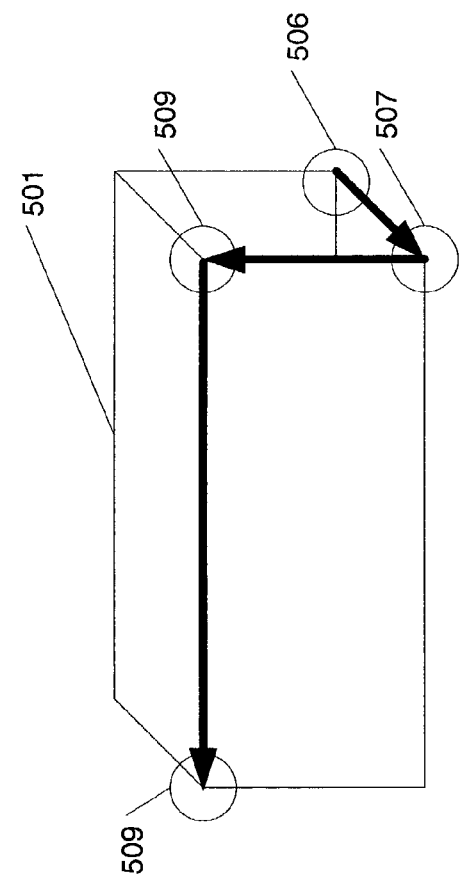
Figure 8A
Figure 8B

VIRTUAL ENVIRONMENT CAPTURE

RELATED APPLICATION

This application claims priority to U.S. Provisional Application Ser. No. 60/432,009, entitled "Virtual Environment Capture System," filed Dec. 10, 2002, whose contents are expressly incorporated herein by reference.

BACKGROUND OF THE INVENTION

1. Field of the Invention

Aspects of the present invention relate to computer modeling of environments. More specifically, aspects of the present invention relate to accurately capturing virtual environments.

2. Description of Related Art

A need exists for three-dimensional models of interior environments. From the gaming community to the military, actual renderings of building interiors based on actual buildings are being sought. For example, applications are being developed to provide training at the individual human level to facilitate improved military operations and capabilities as well as situational awareness. The training of individuals improves with a greater level of realism during the training exercise. For instance, benefits gained form mission rehearsal increase with the realism of the environment in which the mission is rehearsed.

Numerous applications exist for modeling outdoor terrain including satellite mapping and traditional surveying techniques. However, interior modeling techniques have been constrained to using pre-existing computer aided design drawings, building layout drawings, and a person's recollection of an environment. These modeling approaches may rely on out-of-date information (for example, blueprints of a 50-year-old building). Further, these modeling approaches fail to accurately define furniture types and furniture placement. In some situations, one may need to orient oneself based on the furniture and wall coverings of a room. Without this information, one may become lost and have to spend valuable time reorienting oneself with the environment. Further, one may want to know what is movable and what is not movable. Accordingly, realistic interiors are needed for simulation and training purposes.

Traditional methods exist for rendering building interiors including the use of computer aided design (CAD) drawings or laser scanning for the development of 3-D building models. However, as above, these approaches have not been helpful when attempting to interact a rendered environment in real-time. In some cases, the overload of information has made interaction with these environments difficult. For instance, original CAD drawings are not always current and laser scanning requires significant post processing. In particular, laser scanning about a point in space generates a cloud of data points which need to be processed to eliminate redundant points and convert them into easily-handled polygons. Further, laser scanning from one position is sub-optimal as points in a room are generally occluded by furniture. Blocking access to these points makes subsequent image processing difficult as a computer would need to determine whether non-planar points represent furniture or a curve in the wall of a room. To accurately determine the walls and contents of a room, multiple passes may be needed to attempt to eliminate blind spots caused by furniture and other objects. Further, these techniques do not capture data with knowledge of what is being captured.

Some techniques have been used to capture photographs of building interiors. For example, spherical photographic images have been used to capture photographic information surrounding a point in space in a room. While these photographic images may be assembled into a video stream representing a path through the room, deviation from the pre-defined path is not possible.

Accordingly, an improved system is needed for capturing and modeling interior spaces.

BRIEF SUMMARY

Aspects of the present invention are directed to solving at least one of the issues identified above, thereby providing an enhanced image capture and modeling system for creating virtual environments from building interiors. In one aspect, a user is provided with a system for capturing photorealistic images of a building's interior and associating the images with specific data points. The data points may be obtained through use of a rangefinder. In some aspects, an imaging system may be attached to the rangefinder, thereby capturing both data points and photorealistic images at the same time. The user may use the combination of the rangefinder, imaging system, and a system that monitors the vector to the rangefinder from a position in the room and orientation of the rangefinder to determine distances from a central location to various objects about the user. Because of the user's interaction and selection of specific points of objects, objects may be selected and modeled using few data points. In other aspects, other sensors may be used in addition to or in place of the rangefinder and the imaging system. Information generated from the sensors may be combined into a virtual environment corresponding to the actual scanned environment. The rangefinder may include a laser rangefinder or other type of rangefinder. These and other aspects are described in greater detail below.

BRIEF DESCRIPTION OF THE DRAWINGS

Aspects of the present invention are illustrated by way of example and not limited in the accompanying figures.

FIGS. 3A and 3B show relationships between a data capturing unit's location and an illuminated spot in accordance with aspects of the present invention.

FIGS. 8A and 8B show illustrative data points used to determine the location, orientation, and scale of an object in accordance with aspects of the present invention.

DETAILED DESCRIPTION OF THE DRAWINGS

Aspects of the present invention permit rapid capture and modeling of interior environments. Instead of using clouds of data points, which can require significant post processing to determine individual objects and construct a virtual environment, aspects of the present invention relate to capturing specific points in an actual environment and coordinating the point capture with predefined objects. The coordination with objects simplifies or eliminates post processing requirements.

The following description is divided into headings to assist a user in understanding aspects of the present invention. The headings include: modeling; data capture hardware; data gathering processes; data synthesis software; and applications of modeled environments.

Modeling

Interiors of buildings may be used by different entities. For example, architects may use virtual environments during construction of a building so as to properly define locations of walls, HVAC systems and pillars. Architects may also use virtual environments to experiment with remodeling spaces including moving walls and windows. Real estate agents and interior designers may use virtual environments for providing tours to prospective buyers and for suggesting modifications to existing spaces. Police and military units may further use virtual model of interior spaces for rehearsing in real-time delicate missions including rescuing hostages. For example, if a unit needed to rescue hostages from an embassy and the embassy was modeled, the unit would be able to rehearse in real time from a variety of different angles how different missions may be accomplished. Also, using a virtual rendering of a building allows experimentation into blowing holes in the walls to permit entry into adjoining spaces as well as determining potential angles from which enemy combatants may be firing. Further, the modeled environment may be used in distributed simulations in which two or more users or groups of users may interact within the environment. Further, the modeled environment may be used for military training.

To capture and model interior space, the system uses a combination of hardware and software to capture and model an environment.

Figure 1:
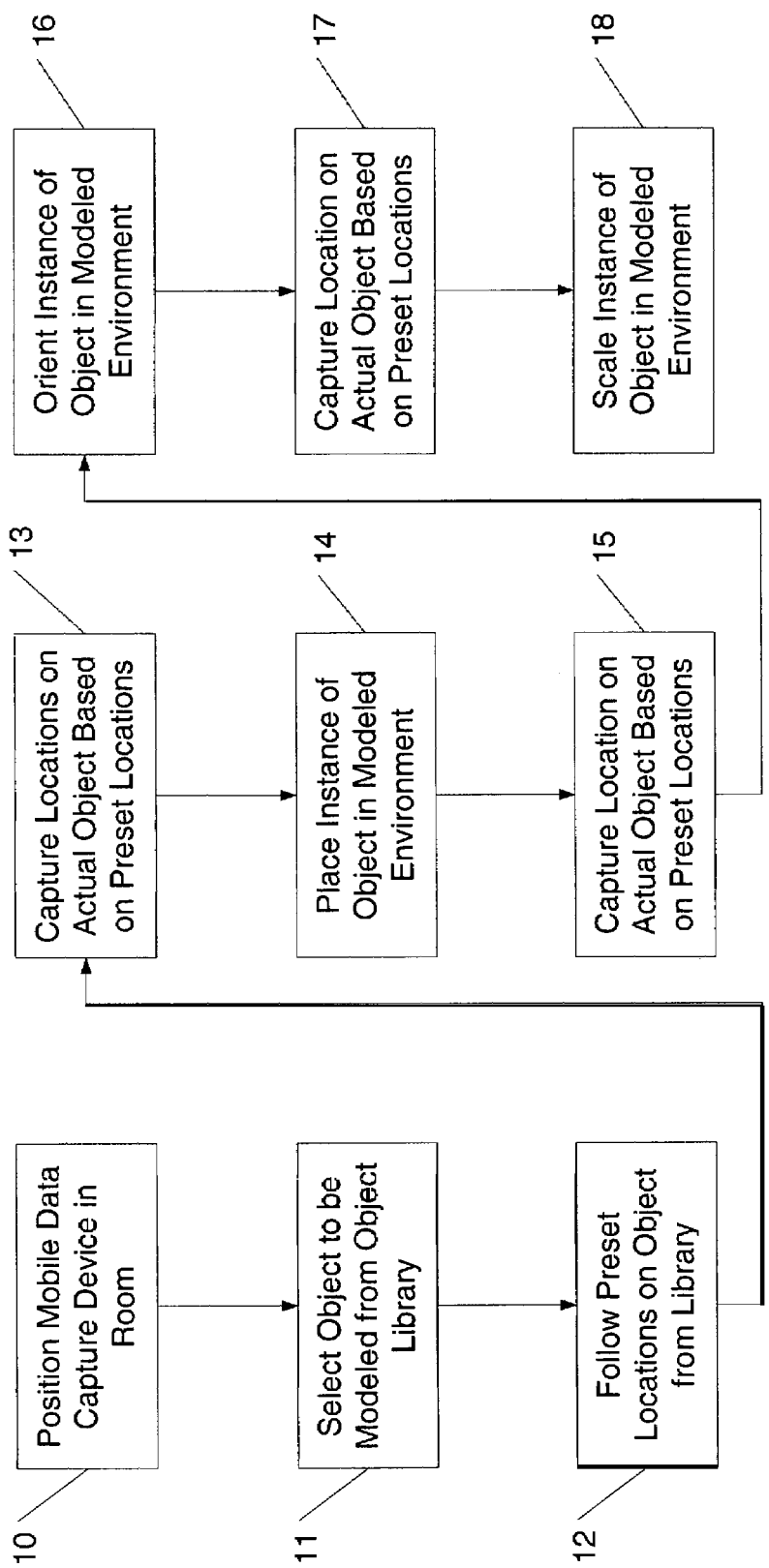
FIG. 1 shows a process for modeling objects in accordance with aspects of the present invention.

The following provides a brief overview of how, in one example, one may model a room. Referring to FIG. 1, in step 10, a user positions a data capture unit in room. Next, in step 11, the user selects an object from an object library or object database corresponding to an actual object in the room. The object library or object database stores one or more groups of objects that may be placed in a virtual environment. The object library or database may include walls, floors, ceilings, chairs, office furniture, pictures and other wall hangings, bookshelves, cabinets, lamps, doors, office equipment, sofas, rugs, tables, and the like.

The selection of the object from the object library or object database may include a list of points that need to be obtained to locate a virtual instance of the object so that it corresponds to the actual location of the object in the actual room. This may be done by navigating a user interface (using a mouse or voice commands) to have the system retrieve the virtual object from the object library or database. The contents of the object library may be established based on information from a customer requesting the modeled environment. For example, the customer may specify that the environment to be captured may be an office (for which an object library of office furniture is obtained), a residential house (for which an object library of typical home furnishings is obtained), an industrial complex (for which industrial machines and other industrial objects are obtained), and the like. In other situations, a generic library of objects may be used.

To case capturing of the points, the points may be gathered in a predefined order as shown in step 12. The order of the points to be gathered may be explicitly shown in the object from the object library or database. Once the system knows which object will be identified next by the user, the user manually guides a rangefinder to illuminate spots on the actual object in the room. The rangefinder described herein may be any suitable rangefinder including a laser rangefinder, a sonar-based rangefinder, a system that determines the position of a probe (wired or wirelessly, a ruler, touch probe, GPS, ultra-wideband radio positioning, for instance), and the like. For purposes of simplicity, the rangefinder is described as a laser rangefinder.

The laser from the laser range finder may be visible light or may be invisible to the unaided eye. When the user has positioned the illuminated spot on a desired position of the object, the user then indicates to the system (manually, verbally, or the like) that the current distance from the illuminated spot on the object to the data capture unit should be read as shown in step 13. Because the system determines the vector to the data capture unit and the angle of the laser rangefinder, the vector from the data capture unit to an illuminated spot may be determined. The location of the captured spot may be used as a three dimensional reference point for the virtual object from the object library.

Next, in step 14, the virtual object may be placed in the modeled environment. Next, in step 15, another point may be captured. In step 16, the instance of the object may be oriented in the modeled environment. In step 17, another point may be captured and, in step 18, the instance of the object scaled with the third point. It is appreciated that, alternatively, the placement of the object instance into the virtual environment may occur only after the scale of the object has been determined in step 18 rather than in step 13.

Figure 2:
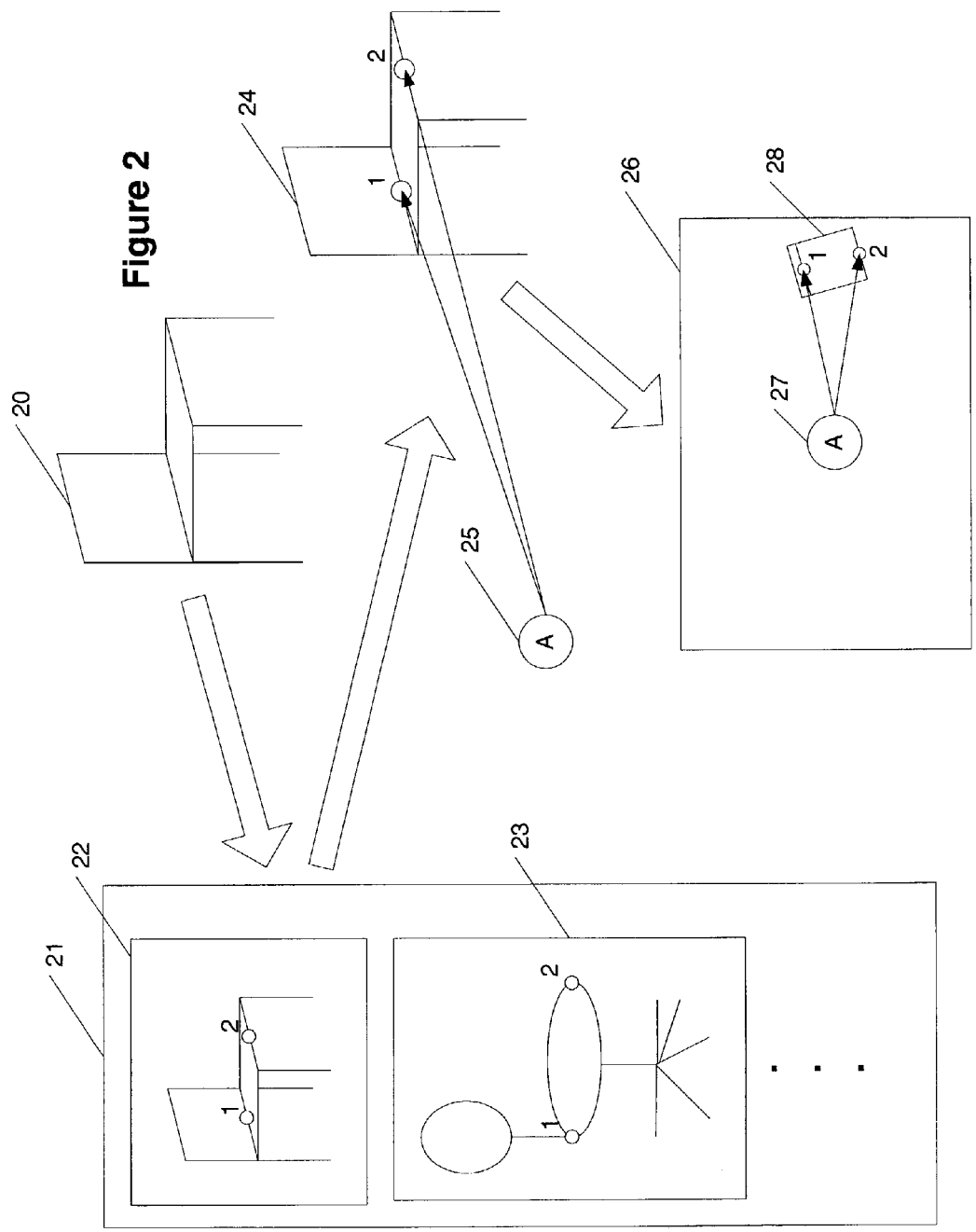
FIG. 2 shows a process for positioning a chair in accordance with aspects of the present invention.

FIG. 2 shows a version of the process of FIG. 1 modeling a chair. A chair 20 exists in an actual room. A user selects a category of a chair most resembling chair 20 from user interface 21. Here, two versions of chairs are shown in user interface 21 including standard chair 22 and desk chair 23. With each version of chair 22 and 23, at least one location is defined with respect to the instance of the chair, indicating where a received location will correlate to a virtual chair. For instance, both of chairs 22 and 23 show locations "1" and "2" that indicate where received locations will be matched to the chairs.

Next, a user directs a laser rangefinder from location A 25 to illuminate spots 1 and 2, sequentially, on chair 24 (which is chair 20 but being illuminated by the laser rangefinder). The user may press a button on the laser rangefinder, may press a button on a mouse, or may speak into a headset to have the system accept the current location illuminated by the laser rangefinder as a location for chair 24. Additional points may be used to further orient and/or scale each chair.

The two locations 1 and 2 scanned from chair 24 are used to orient an instance of the chair in virtual environment 26. The virtual instance of the chair 28 is registered by the two locations 1 and 2 from position A 27 corresponding to position A 25 in the actual room. One position of the two positions 1 and 2 may be used to locate the chair 28 and the other of the two positions 1 and 2 used to specify the angle of the chair 28. It is appreciated that some objects may only be positioned in an environment. For example, one may need only to specify that a plant exists on a desk, rather than determine the orientation and size of the plant. Here, the size of the plant may be predefined in the library of objects.

FIGS. 3A and 3B show a relationship between position A 30 of a mobile data capture unit and that of location 1 on chair 33. As shown in FIG. 3A, a vector 36 is determined from the floor to position A of the mobile data capture unit. This vector may simply be the height of a tripod perpendicular to a floor. Next, a vector is determined between position A and position B of the laser rangefinder 31. The determination of this vector may take into account angle 34 and the distance between locations A and B. With the distance from the laser rangefinder 31 and the angle 35 known (from the orientation of the laser rangefinder 31), one may determine the vector to spot 1 (and 2) on chair 33. FIG. 3B shows a top down view of the arrangement. A relative vector from tripod 30 to rangefinder 31 is determined. The platform orientation and angle upon which the rangefinder 31 rests is determined. Finally, a relative vector from rangefinder 31 to spot 1 of chair 33 is determined. Using these vectors, one may determine the coordinates of spot 1.

The following describes in greater detail the system used to create the modeled environment.

Data Capture Hardware

Figure 4:
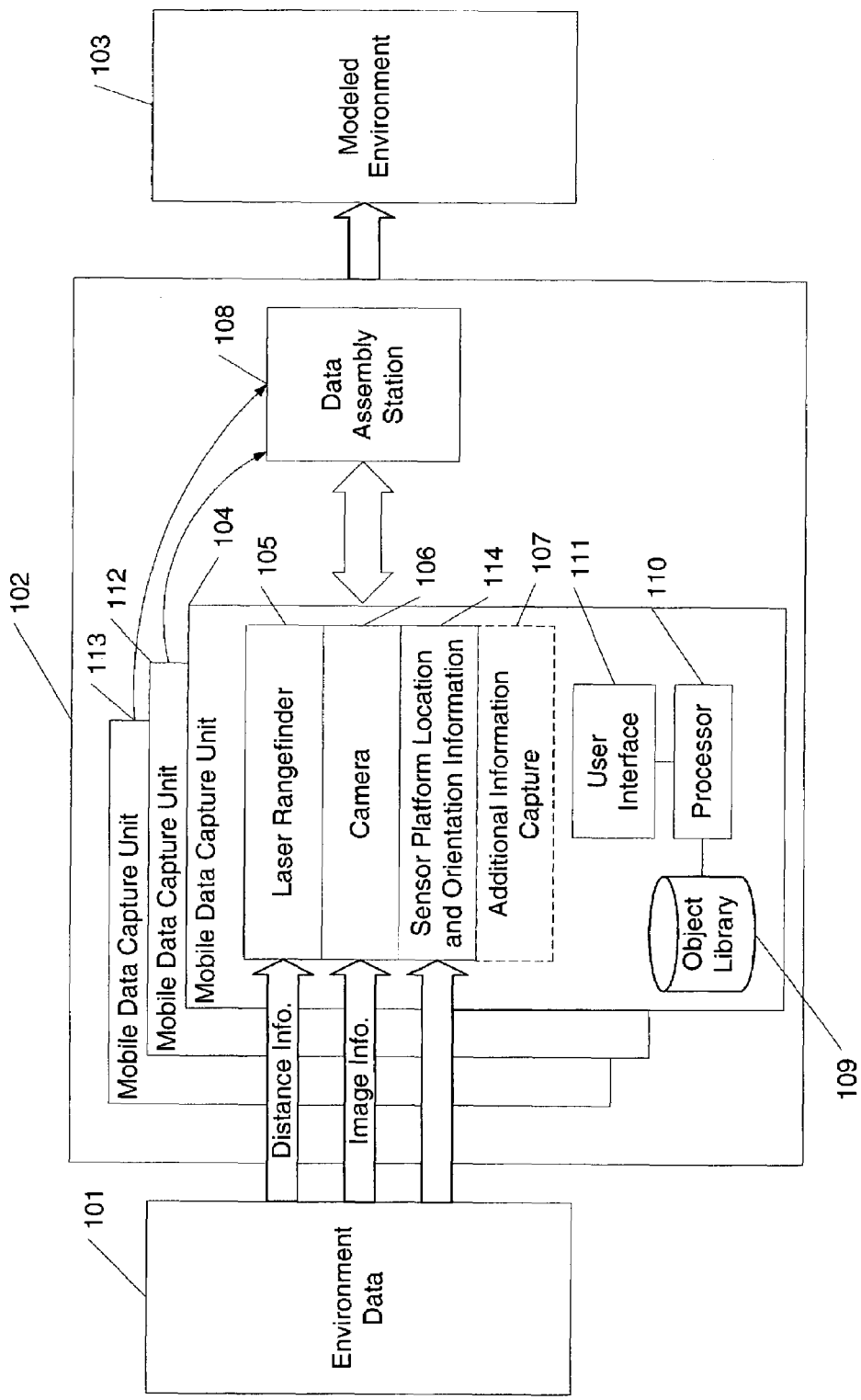
FIG. 4 shows a system for capturing and modeling an environment in accordance with aspects of the present invention.

The data capture hardware may be separated into two systems: a mobile data capture unit and a data assembly station. FIG. 4 shows an example of how environment data 101 may be used by capture and modeling hardware 102 and converted into a modeled environment 103. Environment data 101 includes a variety of information including distance information from a mobile data capture unit 104 to the surrounding environment, image information regarding how the environment appears, and other additional information including light intensity, heat, sound, materials, and the like. These additional sensors may be important to create an immersive environment for mission rehearsal or telepresence. The distance information may be measured by a laser rangefinder 105. Image information of the environment data may be captured by camera 106. Sensor platform location and orientation information may be captured by sensor 114. Optionally, additional information capture sensors 107 may be used to capture the other additional information of environment data 101. The mobile data capture unit 104 transmits information from sensors 105-107 and 114 to data assembly station 108. The mobile data capture unit 104 may export the information to data assembly station 108 without additional processing or may attempt to perform additional processing to minimize need for downstream processing. For example, Data assembly station 108 then creates the modeled environment 103. The data assembly station 108 may use the raw data from the sensors or may use created objects that were created at the mobile data capture unit 104. The data assembly station may also perform checks on the information received from the mobile data capture unit 104 to ensure that objects do not overlap or occupy the same physical space. Further, multiple data capture units (three, for example, are shown here) 104, 112, and 113 may be used to capture information for the data assembly station 108. The data assembly station 108 may coordinate and integrate information from the multiple data capture units 104, 112, and 113. Further, the data assembly station 108 may organize the mobile data capture units 104, 112, and 113 to capture an environment by, for instance, parsing an environment into sub-environments for each mobile data capture unit to handle independently. Also, the data assembly station 108 may coordinate the mobile data capture units 104, 112, and 113 to capture an environment with the mobile data capture units repeatedly scanning rooms, and then integrate the information into a single dataset. Using information from multiple data capture units may help minimize errors by averaging the models from each unit. The integration of data at the data assembly station 108 from one or more mobile data capture units may include a set of software tools that check and address issues with modeled geometry as well as images. For instance, the data assembly station 108 may determine that a room exists between the coverage areas from two mobile data capture units and instruct one or more of the mobile data capture units to capture that room. The data assembly station 108 may include conversion or export to a target runtime environment.

The mobile data capture unit 104 and the data assembly station 108 may be combined or may be separate from each other. If separate, the mobile data capture unit 104 may collect and initially test the collected data to ensure completeness of capture of an initial environment (for example, all the walls of a room). The data assembly station 108 may assemble data from the mobile data capture unit 104, build a run-time format database and test the assembled data to ensure an environment has been accurately captured.

Testing data among multiple mobile data capture units may occur at multiple levels. First, each mobile data capture unit may capture data and test for completeness the captured data. The data assembly station 108 collects data from the mobile data capture units. The received data is integrated and tested. Problem areas may be communicated back to the operators of the mobile data capture units (wire or wirelessly) to resample or fix or sample additional data. Data integration software may be running on the data assembly station (for instance, Multi-Gen Creator by Computer Associates, Inc. and OTB-Recompile may be running). It is appreciated that other software may be run in conjunction with or in place of the listed software on the data assembly station.

The testing may performed at any level. One advantage of performing testing at the mobile data capture units is that it provides the operators the feedback to know which areas of captured data need to be corrected.

The objects created at the mobile data capture unit may have been created with the guidance of a user, who guided the laser rangefinder 105 about the environment and capturing points of the environment or may be inferred from the order or previously captured knowledge of an environment. For example, one may position a door frame in a first room. Moving into the second room, the door frame may be placed in the second room based on 1) the locations of the rooms next to each other, 2) a predefined order in which rooms were to be captured, and/or 3) a determination of the walls being in alignment and the door frame being common to both rooms. The captured points may then be instantiated as objects from a predefined object library 109. These object models from object library 109 may be selected through user interface 111 as controlled by processor 110.

Figure 5:
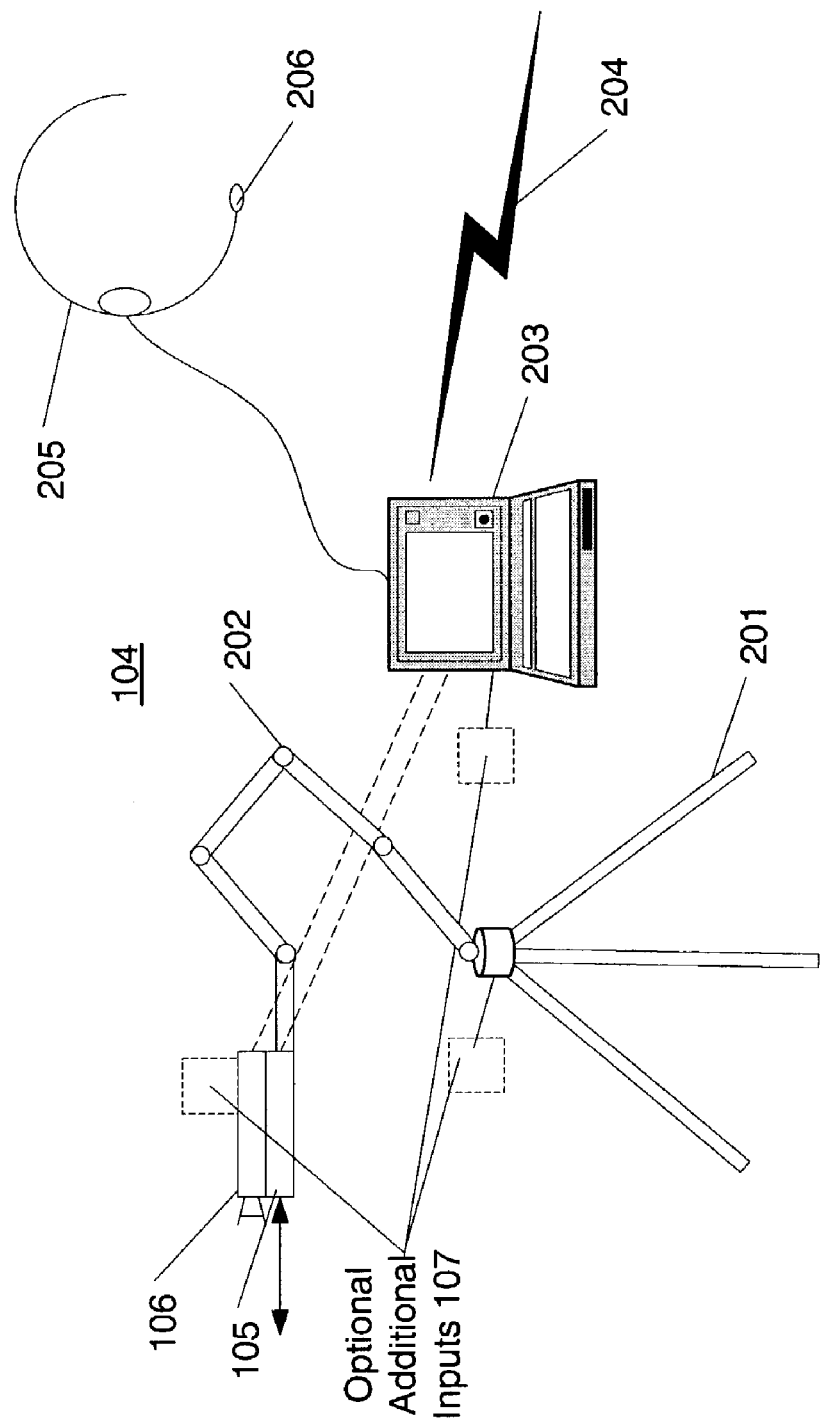
FIG. 5 shows an illustrative data capturing system in accordance with aspects of the present invention.

FIG. 5 shows an illustrative example of mobile data capture unit 104. Mobile data capture unit 104 may include a movable tripod 201 that supports an articulated arm 202, which, in turn, supports laser rangefinder 105 and camera 106. Additional sensors 107 may or may not be included. Additional sensors 107, if included, may be located at a variety of different locations, not necessarily directly attached to laser rangefinder 105 or camera 106. Mobile data capture unit 104 may also include a portable computer 203 to receive and temporarily store information from sensors 105-107. The portable computer 203 may include a generic library of objects or may include a geotypical or geospecific object library. For instance, it may include objects from South East Asia if modeling a home in South East Asia. Further, geospecific or geotypical objects may be used in some rooms while only generic objects used in other rooms.

In one aspect, the laser rangefinder 105 may be separate from the camera 106. In another aspect, the laser rangefinder 105 and the camera 106 may be mounted together and aligned so that the camera 106 will see the image surrounding a spot illuminated by the laser rangefinder 105. The camera 106 can be a digital camera that captures a visual image. The camera 106 may also be or include an infrared/thermal camera so as to see the contents of and what is located behind a wall. Further, camera 106 may also include a night vision camera to accurately capture night vision images.

The laser rangefinder 105 determines distance between an object illuminated by its laser spot and itself. Using articulated arm 202, one may determine the position of the illuminated spot compared to tripod 201. With tripod 201 fixed at a position in a room, the laser rangefinder 105 may be moved about on articulated arm 202 and have all distances from illuminated objects to tripod 201 determined. These distances may be temporarily stored in portable computer 203. Additionally or alternatively, the portable computer may transmit received information over connection 204 to data assembly station 108. Connection 204 may be a wired or wireless connection.

Articulated arm 202 may be a multi-jointed arm that includes sensors throughout the arm, where the sensors determine the angular offset of each segment of the arm. The combination of segments may be modeled as a transform matrix and applied to the information from the laser rangefinder 105. The result provides the location of tripod 201 and the pitch, yaw, and roll of laser rangefinder 105 and camera 106. Multi-jointed arms are available as the Microscribe arms by Immersion.com of San Jose, Calif. and from Faro Technologies of Florida. The specific arm 202 to be used may be chosen based on the precision required in the modeling of an environment. While the laser rangefinder 105 may not benefit from a determination of roll, the camera 106 benefits in that images captured by the camera may be normalized based on the amount of roll experienced by the camera and the images captured by the camera.

Camera 106 may include a digital camera. Any digital camera may be used, with the resulting resolution of the camera affecting the clarity of resultant modeled environments. The images from camera 106 may be mapped onto the surfaces of objects to provide a more realistic version of the object.

Further, articulated arm 202 may be replaced by a handheld laser and camera combination. The handheld combination may include a location determining device (including GPS, differential GPS, time multiplexed ultra wideband, and other location determining systems). The handheld unit may transmit its location relative to the tripod 201, another location, or may associate its position with the data points captured with the laser rangefinder. By associating its position with the information from the laser rangefinder, a system modeling the environment would be able to use the points themselves of an environment, rather than using an encoder arm. For instance, one may use GPS or ultra wide band radio location systems to generate location information without having to be physically connected to the mobile data capture unit 104. Further, different range finding techniques may be used including physical measurements with a probe or the like may be used to determine points in the environment.

In one example, the mobile data capture unit 104 may be controlled by a keyboard and/or a mouse. Alternatively, mobile data capture unit 104 may also include a headset 205 including a microphone 206 for receiving voice commands from an operator. The operator may use the microphone 206 to select and instruct the portable computer 203 regarding an object being illuminated by laser rangefinder 105 and captured by camera 106.

It is noted that the camera 166 does not need to be attached to the laser rangefinder 105. While attaching the two devices eliminates processing to correlate a spot from the laser rangefinder 105 with an image captured by camera 106, one may separate the laser rangefinder from the camera and have the camera view an illuminated object and apply an offset matrix to the camera 106 and the laser rangefinder 105 to correlate the camera image with the location of the illuminated object.

Referring to FIG. 4, data assembly station 108 may receive transmitted information over connection 204 from portable computer 203. Data assembly station 108 may assemble the received information into a modeled environment. Data assembly station 108 may include a computer capable of processing significant data sets. For example, data assembly station 108 may include a 3 gigahertz processor with 1 GB of RAM, 128 MB video card, and an 80 GB hard drive, for instance. The data assembly station 108 may capture rooms or may only assemble rooms from one or more mobile data capture units 104. Further, data assembly station 108 may perform an error checking operation to determine if any walls, doors, ceilings, and/or floors were not created or need to be resampled.

Data Gathering Processes

Figure 6:
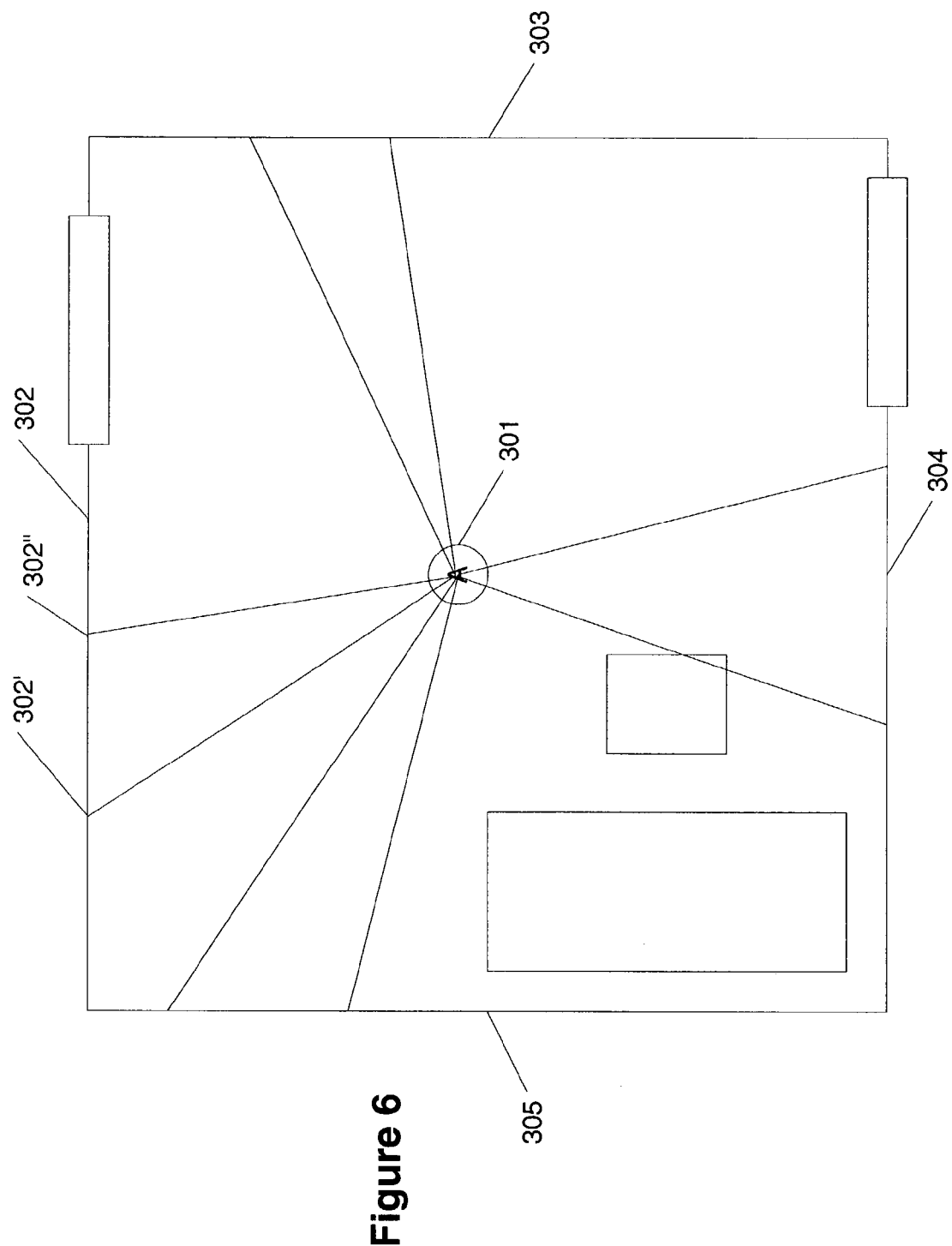
FIG. 6 shows the scanning of walls in accordance with aspects of the present invention.

FIG. 6 shows a room to be modeled. A mobile data capture unit is shown at position A 301. A user may direct the laser rangefinder 105 at wall 302 and determine the locations of spots 302' and 302" relative to position A. To accurately model a plane, one needs at least three data points. However, one may accurately model a plane with fewer than three data points by making certain assumptions or global characteristics of the environment (that may be specified before, during or after data capture). For example, if the environment to be modeled includes walls perpendicular to floors, then only two data points are needed to model a wall. It is appreciated that sometimes multiple data points may be needed for a single wall or wall segment based on errors in readings. From position A 301, a user may determine the three dimensional position of walls 303, 304, and 305. Of course, one may differ from these assumptions or global characteristics when needed to accurately model an environment.

Figure 7:
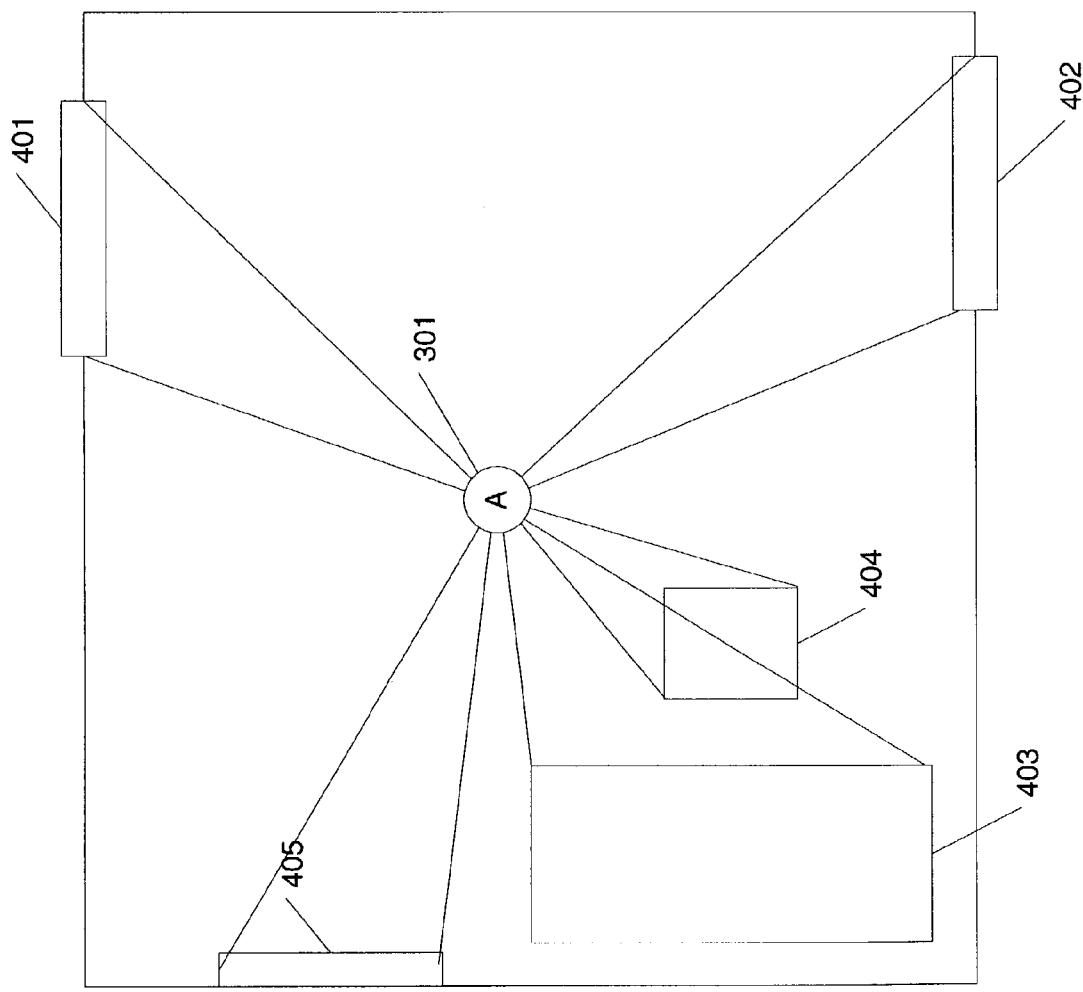
FIG. 7 shows the scanning of objects in accordance with aspects of the present invention.

FIG. 7 shows additional objects being modeled from position 301. A user determines the three dimensional points of doors 401 and 402. Next, the user determines three dimensional points for desk 403 and chair 404. Finally, the three dimensional points for picture 405 may be determined as well. The visual likeness of picture 405 may also be captured by mobile data capture unit 104 at position 301. The visual likeness of picture 405 may then be added into the modeled environment.

FIGS. 8A and 8B show a number of data points that may be captured to determine the size of an object to be placed in a modeled environment. FIGS. 8A and 8B, for example, show a rectangular desk whose dimensions are about to be captured. Using laser rangefinder 105, a user illuminates a few points on desk 501 and effectively captures the dimensions of desk 501. In FIG. 8A, a user may start with a bottom right corner of a desk at position 502, capture position 503 at the bottom left corner of a desk, capture position 504 at the top left corner of the desk, and then capture position 505 at the top left back corner of the desk 501. FIG. 8B shows the same dimensions of desk 501 being captured but in a different order. The location of back right corner 506 is determined, followed by the front right bottom corner 507 followed by the front right top corner 508, then followed by the top front left corner 509. It is appreciated that various paths may be chosen to determine the dimensions of objects and the locations of objects from mobile data capture unit 104. The paths shown in FIGS. 8A and 8B are for illustrative purposes only. Other paths may be used to determine the dimensions and location of an object.

In one aspect, the user may follow a predefined path or series of locations on an object and have a processor match an instance of an object to the obtained locations. Alternatively, the user may obtain the locations in a random order and have the processor attempt to orient the instance of the object to fit the obtained locations.

Figure 9A:
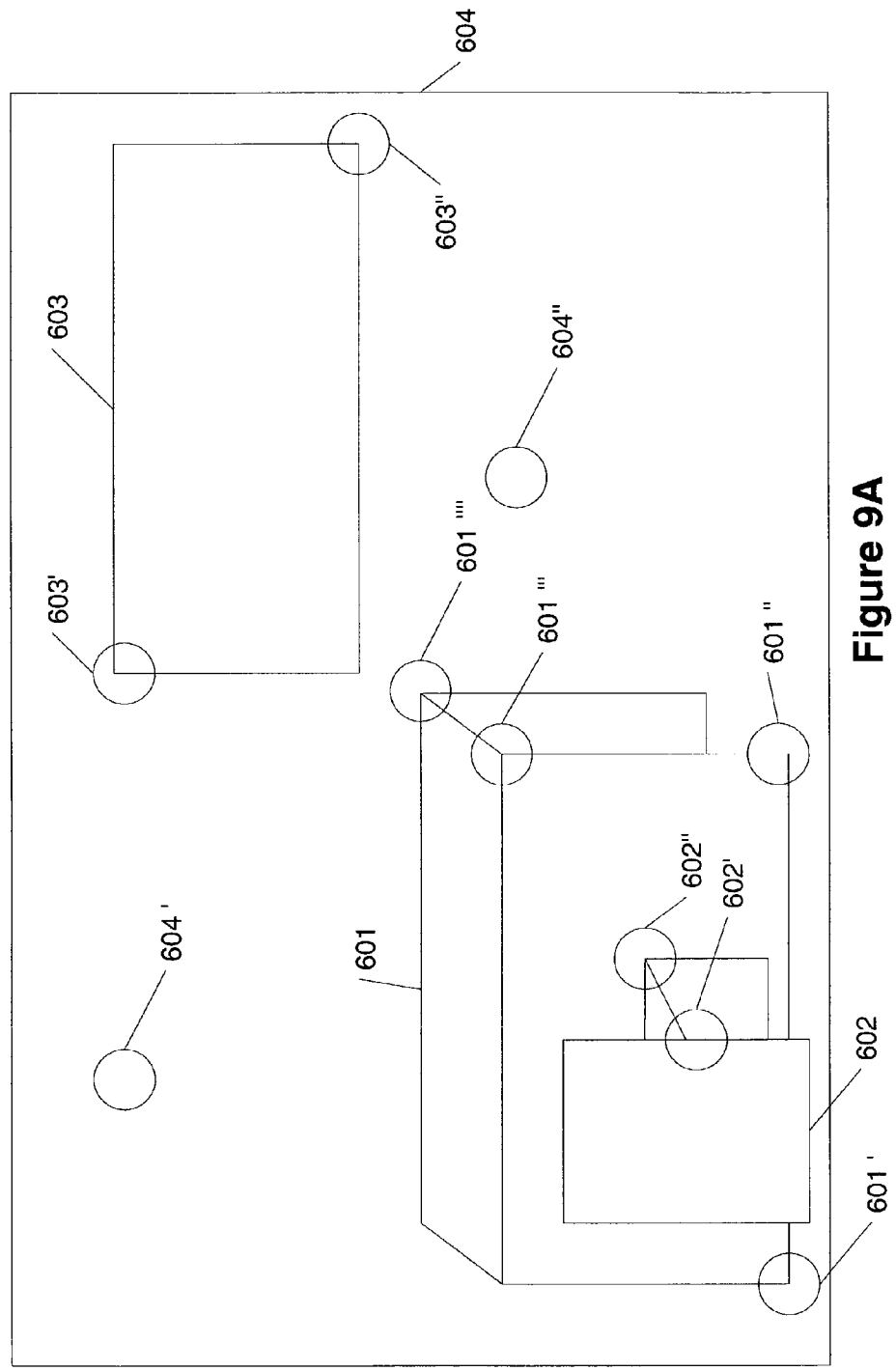
FIGS. 9A and 9B show the capturing points of multiple objects in accordance with aspects of the present invention.
Figure 9B:
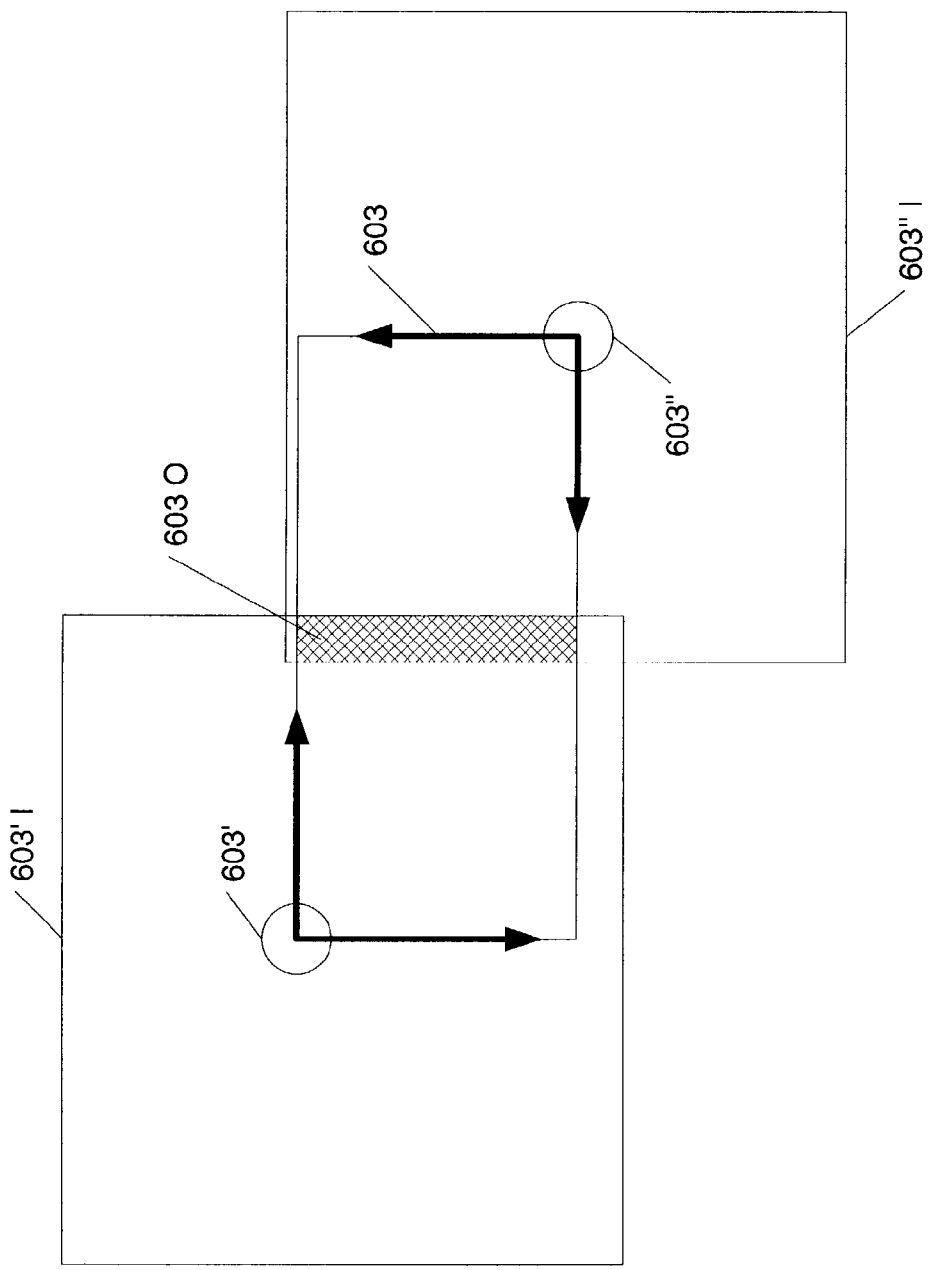

FIGS. 9A and 9B show objects in a room to be modeled. The objects include a desk 601, a chair 602, and a picture 603 on wall 604 in FIG. 9A. To model the room has shown in FIG. 9A, a user may start with any of the objects. For instance, a user may start by modeling chair 602 and locating spots 602' and 602" to accurately position a chair in relation to a mobile data capture unit 104. Next, a user may highlight spots 601', 601", 601''', and 601'''' to determine the position of desk 601 in relation to a mobile data capture unit 104. Next, a user may record the location of spots 604' and 604" to determine the location of wall 604. Finally, the user may record the location of spots 603' and 603" to determine the dimensions of rectangle picture 603. Alternatively, one may start with modeling the walls, ceiling, and floor, prior to modeling objects in the room. One advantage to modeling walls, ceilings and floors before modeling other objects is that the other objects may be aligned with the walls, ceilings, and floors as they are instantiated.

FIG. 9B shows an example of how the image of picture 603 may be captured as well. A model of a rectangular picture may be obtained from the object library 109. The instance of the object may use two locations to define itself in an environment. A user may obtain the locations of spot 603' and 603" as the two locations for the instance of picture 603. Camera 106 may be aligned with laser rangefinder 105 so that the spot illuminated by laser rangefinder 105 falls roughly in the center of the field of view of camera 106. Image 603' I is the image captured by camera 106 when the laser rangefinder 105 is illuminating spot 603'. Also, image 603" I is the image captured by camera 106 when the laser rangefinder 105 is illuminating spot 603". Because of an order of capturing locations as specified by the instance of the picture, the dimensions of the picture may be specified. The instance of the picture may also include an indication of what visual information is relevant to it. For location 603', the relevant image information from image 603' I is the bottom right quadrant of the image. For location 603", the relevant image information from image 603" I is the top left quadrant of the image. These two quadrants of the images may be correlated until an overlap is found (shown here as region 603 O). The two images 603' I and 603" I may be merged using this overlapping region 603 O as a guide. Image portions lying outside the picture may be eliminated. Further, the remaining image may be further parsed, cropped, skewed, stretched, and otherwise manipulated to rectify its image in association with a modeled version of picture 603. This may be necessary if the angle capturing picture 603 resulted in a foreshortened image of the picture 603.

Figure 10:
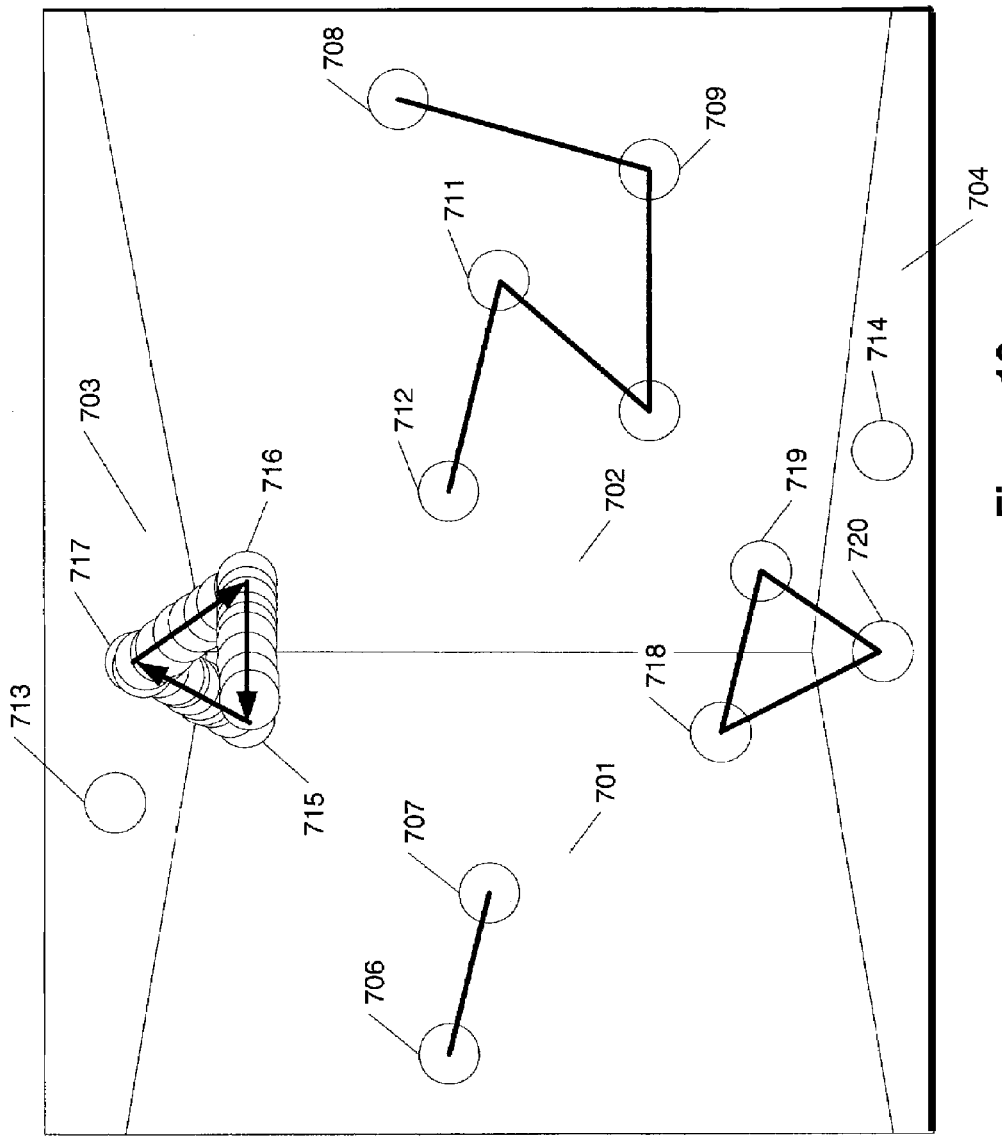
FIG. 10 shows various data capturing techniques for determining points associated with objects in accordance with aspects of the present invention.

FIG. 10 shows a variety of spots that may be selected to model walls of a room. The corner of the room as shown in FIG. 10 includes walls 701 and 702, ceiling 703, and floor 704. The floors, ceilings, and walls may be considered objects and/or planes. Wall 701 may be determined by capturing spots 706 and 707. Wall 702 needed additional spots 708-712 to accurately determine its location. This may be because of textures on wall 702 that affected the reflectivity of a spot or other reasons. A user may then repeatedly obtain locations of spots on an object until that object has been correctly located in a room. The height of ceiling 703 may be determined by spot 713 and depth of floor 704 below the mobile capturing device 104 may be determined by spot 714. A user may select objects corresponding walls, floors, and ceilings. These objects may be grouped. For example, objects representing walls that are perpendicular to both floors and ceilings may be grouped together. Objects representing walls that are not perpendicular to floors and ceilings may be grouped together. Further, slanted ceilings and floors may also be specified as objects. Alternatively, a user may set defaults in the system to start with all walls being perpendicular to floors and ceilings and all floors and ceilings being parallel to one another. Corners may be determined by the intersections of these objects.

In an alternative approach, one may concentrate on corners of the room to locate walls, ceilings, and floors. For instance, one may locate spots 715-717 to determine one corner and locate spots 718-720 to determine another corner. Locating corners as opposed to walls per se provides the benefit of being able to locate corners relatively easily when walls are occluded by multiple objects. Alternatively, one may locate walls separately and have locations of corners determined by data assembly station 108 as described above. This alternative approach eliminates issues of corners being occluded by furniture and other objects. Further, one may specify points 715-717 and the rangefinder repeatedly scan between the points, thereby constructing a number of points from which the planes of the walls and ceilings may be determined. Further, the intersecting edge between the plane of the ceiling and those of the walls may be determined from the multiple scans between the points by obtaining the maximum/minimum values of the points and using these values to determine the location of the edge. This technique may be used for other objects or intersection of objects as well. This technique uses some degree of automation to speed up data capture, thereby capturing knowledge of the environment at a higher level.

Figure 11:
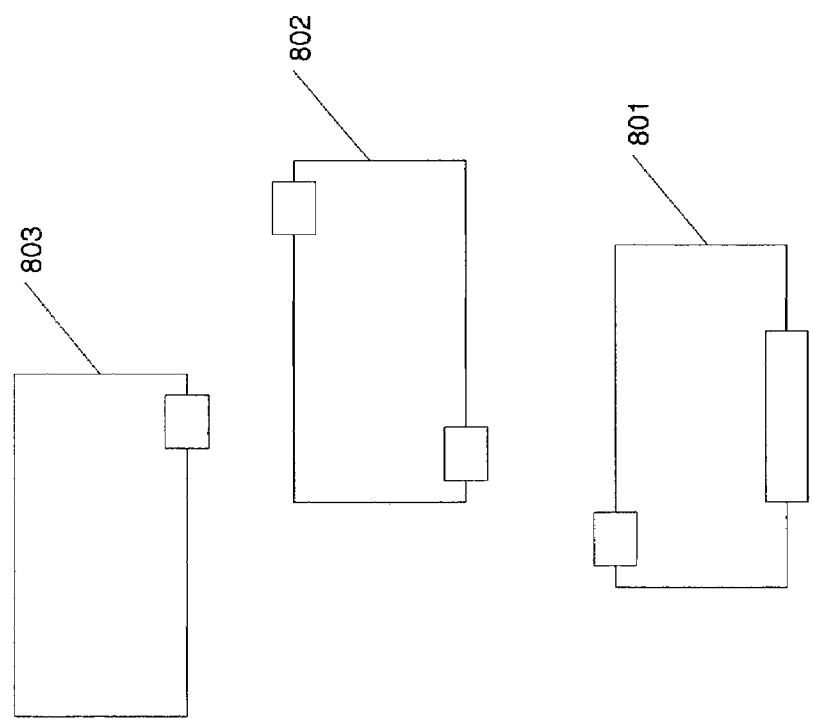
FIG. 11 shows rooms to be assembled into an environment in accordance with aspects of the present invention.

A user may move between multiple rooms to capture the environments of each room. FIG. 11 shows three rooms 801-803 having been captured. The organization of rooms 801-803 into a single unified building may be accomplished by data assembly station 108. The data assembly station 108 may use a variety of techniques of locating rooms 801-803 in relation to each other. For example, a user may indicate to data assembly station 108 which room follows a current room. Alternatively, a mobile data capture unit 104 may include a sensing device or transceiver that identifies its location. For example, the mobile data capture unit 104 may include a global positioning system (GPS) locator that determines its position absolutely. Alternatively, the mobile data capture unit 104 may include a differential GPS locator system. Further, the mobile data capture unit 104 may include a time multiplexed ultra wideband locator.

Figure 12:
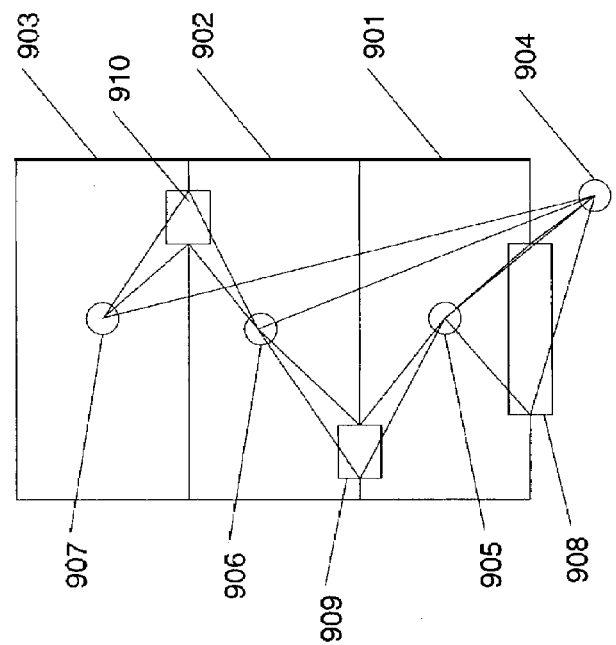
FIG. 12 shows rooms to be assembled into an environment using common data points in accordance with aspects of the present invention.

FIG. 12 shows a stepwise approach used to determine the position of rooms. Rooms 901-903 are being modeled. Before, during, or after modeling each room, a user may locate the rooms in relation to one another. First, for example, a user at location 904 may determine the location of an object common to its current location and the next location to be captured. In FIG. 12, a doorframe is used as the object between various rooms. Alternatively, one may use a mobile device (for instance a T-shaped reflector in which laser rangefinder determines the locations of each arm of the T) to place between rooms so as to locate the rooms in relation to one another. It is appreciated that most any object that is viewable from two or more locations may be used to coordinate room location determination. By indicating during capturing which points relate to other previously captured points, one may indicate how rooms interrelate.

From position 904, a user locates doorframe 908 and determines its location with respect to position 904. Next, the user moves to position 905 and determines the location of doorframe 908 from the perspective of position 905. Next, the user then determines the location of doorframe 909 from perspective of position 905, then moves to position 906 and again determines the location of doorframe 909 from the perspective of position 906. Finally, the user locates doorframe 910 from both of positions 906 and 907. Using this stepwise approach, the locations of the mobile data capture unit as it moves between positions 904-907 may be determined.

Figure 13:
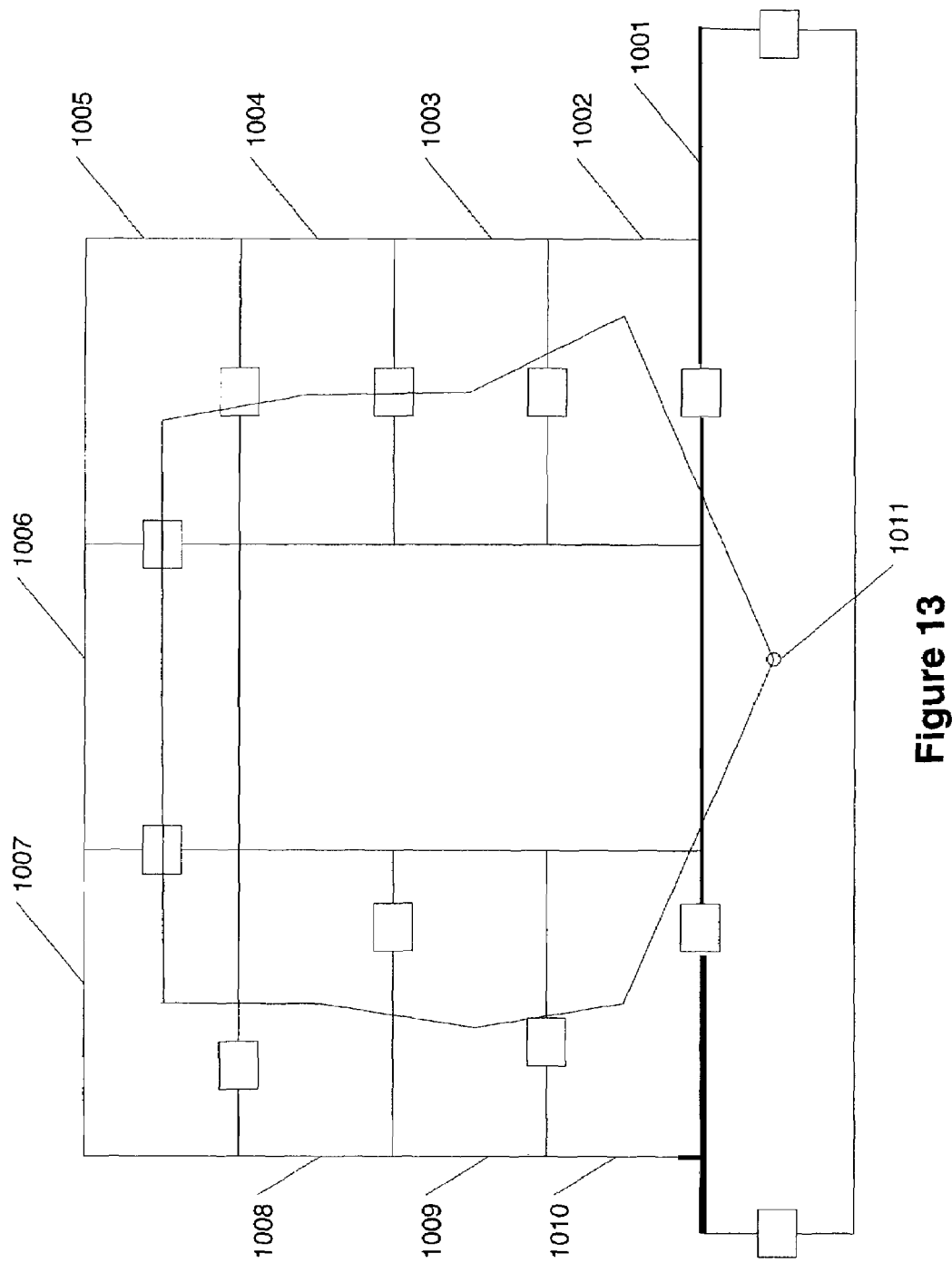
FIG. 13 shows an illustrative process for minimizing and distributing measurement errors by traversing a circuit in accordance with aspects of the present invention.

This stepwise approach as shown in FIG. 12 may be used also to eliminate measurement errors as shown in FIG. 13. A user attempts to map rooms 1001-1010. A user starts at location 1011 and captures each room 1002-1010 in succession or in any order. Next, upon completing the last room, the data assembly station 108 may use the fact that the start and stop locations at position 1011 are the same. Accordingly any error in measurement between the start and stop locations may be sequentially removed from the various measurements of the rooms 1002-1010. For instance, the error value may be divided by the number of rooms and the apportioned error correction sequentially subtracted from each room.

Data Synthesis Software

Figure 14:
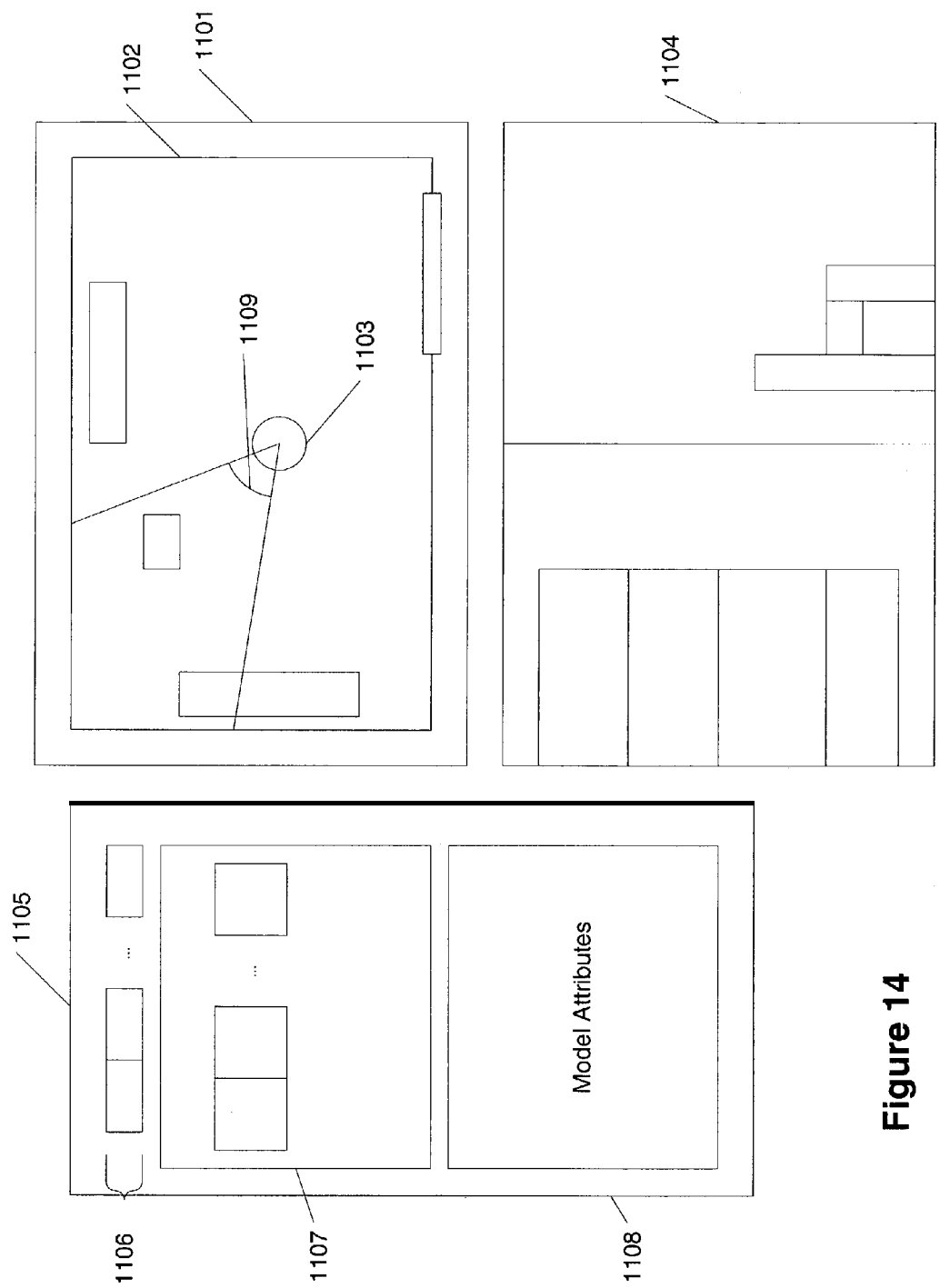
FIG. 14 shows a user interface for modeling an environment in accordance with aspects of the present invention.

FIG. 14 shows a user interface displayable on portable computer 203. Region 1101 shows a virtual room 1102 having been constructed from objects whose locations were determined from position 1103. The locations where then used to specify the locations of objects as shown in region 1101. Field of view 1109 shows the field of view of camera 106 from position 1103. Region 1104 shows a perspective view of a region of virtual room 1102 as currently modeled from the field of view 1109. Region 1104 is beneficial as it permits a user who may be standing in an actual room facing in a direction corresponding to field of view 1109 to compare his view of the room with the view of virtual room 1102 as shown in region 1104. This way, the user would be able to immediately determine which objects, actually present in the room, are missing from the modeled environment as shown in top down view 1101 and perspective view 1104. Alternatively, the data assembly station 108 may keep a list of those items that need to be captured and inform the mobile data capture units 104, 112, and 113 which items need to be captured. The list may contain information and specify if the items are to be geospecific or geotypical to a location. Additionally, attributes needed for those items may be filled in and added to the object library for future retrieval.

Region 1105 shows a user interface similar to that of user interface 21 of FIG. 2. Region 1105 shows various models of objects to be instantiated in a rendered environment. One may select a model library and perform other operations (including opening, closing, saving, and other general operations) using interfaces shown in region 1106. For example, other operations may include correlating objects to one another (including placing objects like desks and chairs on a floor as opposed to floating in the middle of a room), aligning objects, rotating objects, flipping objects, and deleting objects. In short, one may manipulate the objects placed in region 1101 and 1104 to make them appear as they actually are in an actual room.

Region 1107 display is a variety of objects to be selected. For example, various types of office desks may be shown for placement as the desk in FIGS. 5A, 5B, and 6 (or various types of chairs as shown in FIG. 2). Upon selection of an object from region 1107, the system may indicate which points may be used to locate the object. For example, an image of a desk with various points at the corners of the desk may be shown to a user, to prompt the user to select the various points. The points may be selected in any order, or may be selected in a specified order. One advantage of selecting in a specified order allows portable computer 203 to rotate and scale an object without substantial user interaction. Finally, region 1108 may show various model attributes of a selected object. These after the may include color, texture, reflectivity, material composition, part number, and other options to be associated with the object (for example, an empty bookshelf or a full bookshelf or an empty desk or a cluttered desk or the tracking identification of a computer on a desk). Using the interface as shown in FIG. 14, or with additional user interface regions or without the shown regions, a user may guide the data capture process so as to quickly and efficiently model a room.

Figure 15:
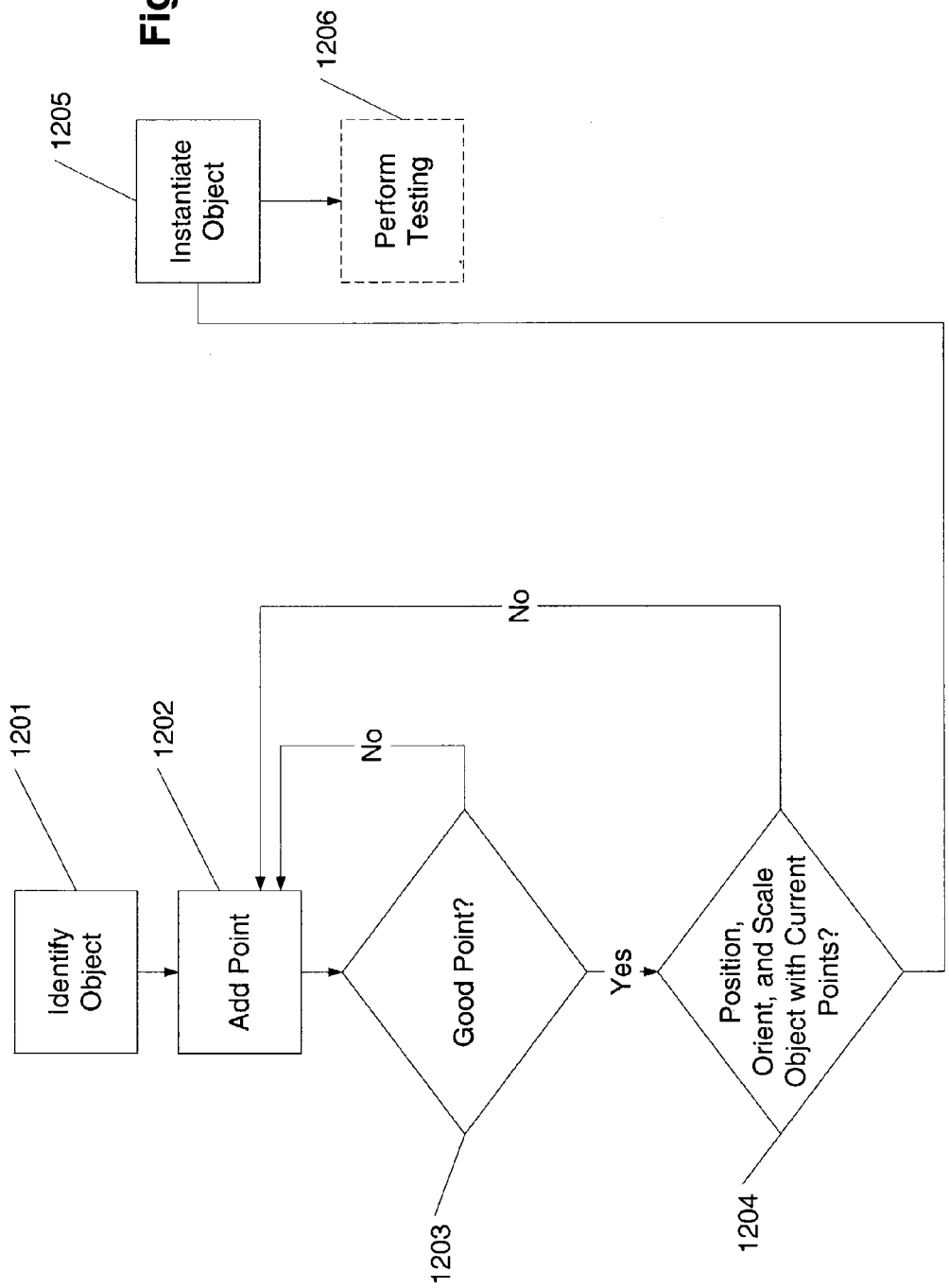
FIG. 15 shows a process for positioning an object in an environment in accordance with aspects of the present invention.

FIG. 15 shows a process for constructing an object in accordance with aspects of the present invention. In step 1201, a user identifies an object to be modeled. Next in step 1202, the user adds a point using the rangefinder 105 to the object selected in step 1201. Next, in step 1203, the system determines if the point was accurately determined (for example, within a tolerance of sub inches to inches). If no, the system returns to step 1202 where another point is obtained. If yes from step 1203, the system determines in step 1204 if the object selected in step 1201 may be positioned, oriented, and scaled with the current number of points (with some objects requiring more points than others). If no, an additional point is obtained in step 1202. The designation of which points to obtain may be left to the user or may be identified by the system. If yes from step 1204, the system instantiates the object into the virtual environment with specific points of the object corresponding to measured values from actual captured locations from laser rangefinder 105 in step 1205. It is appreciated that the object may be instantiated in step 1205 prior to determination of its orientation and scale, using a default orientation and scale from the object library. Alternatively, one may construct an object from the captured points, not relying on the objects from the object library.

Finally, shown in broken line is step 1206 where testing may be performed. Various tests may be performed to attempt to complete the capture data of an environment. For instance, one may test to see if a captured environment encloses 3D space. If not, then the missing pieces may be obtained. One may test to see if all polygons face the interior of a room.

While one may specify that both sides of polygons are to be mapped with graphics, a savings of run-time processing power is achieved when only the visible sides of polygons are mapped. Testing the polygons permits one to ensure that the sides of the polygons that are to have graphics are facing inward toward the inside of a room. One may test to ensure that polygons share vertices. The polygons may be adjusted so that vertices match. One may test to see if distinct rooms share the same rendered space (for instance, to determine if rooms intersect), excessive gaps between walls, walls are a constant thickness (where specified), and floors and ceilings are the same level (where specified). The specification of these items mentioned above may occur before, during, and/or after data capture. In one example, the specification of the height of the ceiling may be specified when a project is first started (along with other requirements including maximum error tolerances) and the like.

Applications of Modeled Environments

Figure 16:
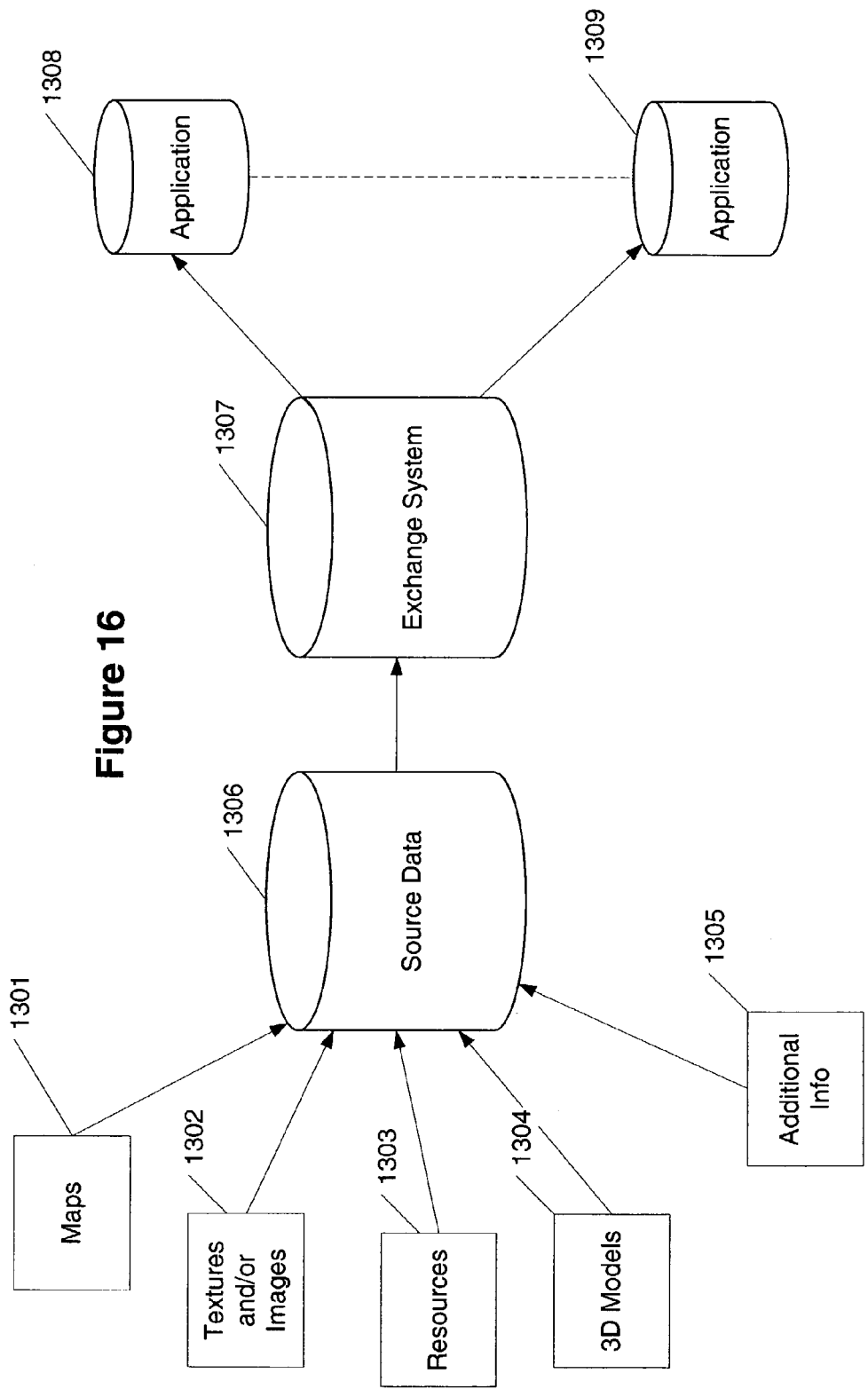
FIG. 16 shows a conceptual set of relationships describing how information regarding an environment may be forwarded to applications in accordance with embodiments of the present invention.

FIG. 16 shows how environments may be combined with additional information and forwarded to additional applications. For example, maps of an environment 1301, textures and/or images 1302, resources 1303 including weather information, environmental information, civil engineering structures, and the like, three-dimensional models 1304, and additional information regarding an environment (internal or external) 1305 may be combined in database 1306. This modeling information as stored in database 1306 may be provided to a data exchange system that interacts with a number of applications 1308-1309. For example these applications may include training simulators for military and police units, architects, real estate agents, interior and exterior decorators, civil planners and civil engineers, and the like.

Revenue may be generated from the ability to exchange information as shown in FIG. 16. For example, source data 1306 may be supplied for a fixed-price to exchange system 1307. Alternatively, applications may only require certain sets of information from source data 1306. Accordingly, applications 1308-1309 may only wish to pay for specific data sets that they require. These and other approaches may be used to generate income based on the modeling techniques described herein. The system may support a variety of runtime formats. By adding in a new driver for each format, one may export a modeled environment to a desired format (including VRML, CAD, binary separate planes, CTDB, OpenFlight, GIS, SEDRIS, and the like).

To establish the specific requirements, tolerances, type of object library to use, and the like, a customer may be interviewed to determine the extent of the modeling requirements. For instance, a single house may only need a single modeler. However, a complex may require two or more mobile data capture units. Further, these mobile data capture units may have redundant capabilities or may have complementary data capturing capabilities (for instance, one mobile data capturing unit may have a visual camera associated with a rangefinder and second mobile data capturing unit may have a thermal camera associated with the rangefinder). The requirements may also specify the accuracy needed for the project. If, for example, a project requires certain accuracy and a mobile data capture unit exceeds the predefined accuracy tolerance, then the mobile data capture unit may be alerted to this issue and the mobile data capture unit instructed to reacquire data points to conform to the accuracy tolerance. Further, the data assembly station may coordinate mobile data capture units to work together as a team to capture environments and not duplicate efforts. To this end, the data assembly station may assign tasks to the mobile data capture units and monitor their completion of each task.

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. Apparatus for modeling a plurality of physical objects in a real environment, comprising: a mobile data capture unit comprising a rangefinder and a user interface configured to display a plurality of virtual objects each corresponding to a physical object, wherein each displayed virtual object includes one or more location points indicating where a user should aim the rangefinder to measure a part of a corresponding physical object, wherein the user interface is configured to display a plurality of location points for each virtual object, each location point indicating where the user should aim the rangefinder to measure the corresponding physical object; and a data assembly station configured to orient one or more of the virtual objects in a modeled environment based on one or more measurements taken by the rangefinder in the real environment, wherein the data assembly station is configured to orient an angle of the virtual object in the modeled environment on the basis of a plurality of measurements from the rangefinder.

2. The apparatus of claim 1, wherein the mobile data capture unit comprises a camera configured to receive an image of a physical object corresponding to one of the virtual objects.

3. The apparatus of claim 2, wherein the apparatus is configured to store the image of the physical object as part of a virtual object in the modeled environment.

4. The apparatus of claim 1, wherein the data assembly station is configured to modify a size of the one or more oriented virtual objects based on measurements received from the rangefinder.

5. The apparatus of claim 1, wherein the user interface is configured to allow a user to select one of the plurality of virtual objects and place it in the modeled environment prior to taking measurements with the rangefinder.

6. The apparatus of claim 1, wherein the mobile data capture unit and data assembly station are combined into a single unit.

7. The apparatus of claim 1, wherein the mobile data capture unit and data assembly station are separate units.

8. The apparatus of claim 1, wherein the mobile data capture unit comprises a multi-jointed arm supporting the rangefinder and a camera.

9. The apparatus of claim 1, wherein the mobile data capture unit is configured to receive user input indicating that the rangefinder has been aimed at one of the location points on a corresponding physical object and, in response thereto, storing a distance obtained from the rangefinder.

10. Apparatus for modeling a plurality of physical objects in a real environment, comprising:

means for displaying a plurality of virtual objects each corresponding to a physical object, wherein each displayed virtual object includes one or more location points indicating where a user should measure a corresponding physical object, wherein a user interface is configured to display a plurality of location points for each virtual object, each location point indicating where a user should aim a rangefinder to measure the corresponding physical object;

means for determining a distance to one of the plurality of physical objects in the real environment; and means for orienting one or more of the virtual objects in a modeled environment based on one or more measurements taken in the real environment by the means for determining a distance, wherein a data assembly station is configured to orient an angle of the virtual object in the modeled environment on the basis of a plurality of measurements from the rangefinder.

11. The apparatus of claim 10, wherein the means for detecting comprises a laser rangefinder.

12. A method of modeling physical objects in a real environment, comprising the steps of: (1) causing to be displayed on a computer display a plurality of virtual objects and displaying, for each virtual object, one or more location points indicating where a user should aim a rangefinder to measure a corresponding physical object, wherein a user interface is configured to display a plurality of location points for each virtual object, each location point indicating where a user should aim a rangefinder to measure the corresponding physical object; (2) receiving a selection of one of the virtual objects and placing the selected virtual object into a modeled environment; (3) receiving one or more measurements of the corresponding physical object from a rangefinder in response to user-selected points on the corresponding physical object; and (4) orienting the selected virtual object in the modeled environment based on the received one or more measurements, wherein a data assembly station is configured to orient an angle of the virtual object in the modeled environment on the basis of a plurality of measurements from the rangefinder.

13. The method of claim 12, wherein step (1) comprises the step of displaying a plurality of location points for the virtual object; wherein step (3) comprises the step of receiving a plurality of measurements of the corresponding physical object, and wherein step (4) comprises the step of orienting an angle of the virtual object in the modeled environment.

14. The method of claim 13, wherein step (1) comprises the step of displaying an ordered plurality of location points for the virtual object, and wherein step (3) comprises the step of receiving the plurality of measurements in the ordered plurality.

15. The method of claim 12, wherein step (3) comprises the step of receiving one or more measurements each taken from a point on the physical object corresponding to one of the location points associated with the selected virtual object.

16. The method of claim 12, further comprising the step of capturing an image of the physical object and registering the image with the virtual object in the modeled environment.

* * * * *